Figure 1:
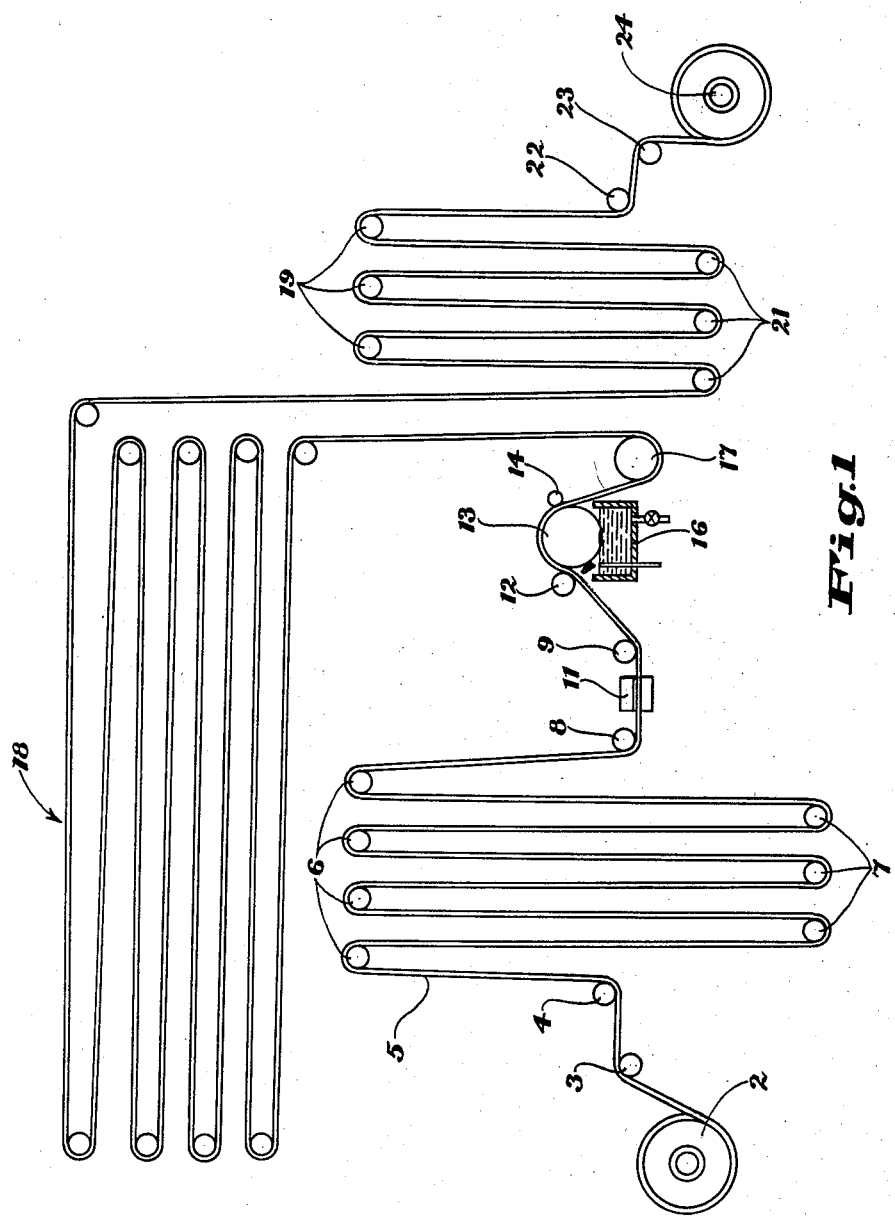

March 15, 1960      R. B. SMITH      2,928,135
PROCESS FOR EMBOSSING FILM

Filed Jan. 7, 1957      2 Sheets-Sheet 1

Robert B. Smith
INVENTOR.

BY
ATTORNEYS

United States Patent Office 2,928,135
Patented Mar. 15, 1960

2,928,135

PROCESS FOR EMBOSSING FILM

Robert B. Smith, Rochester, N.Y., assignor to Eastman Kodak Company, Rochester, N.Y., a corporation of New Jersey Application January 7, 1957, Serial No. 632,696

4 Claims. (Cl. 18—56)

This invention relates to a method for embossing film. More particularly this invention concerns an improved method for preparing embossed film which is relatively free of stripping defects.

There are a number of methods and apparatus for embossing films, sheets and the like, which are already known in the prior art. In general in prior art methods the sheet to be embossed is heated to soften or is solvent softened. Then the softened sheet is contacted with the embossing device which carries a design. The design or other configuration contained on the embossing device is transferred to the softened sheet. The embossed sheet is then removed from the embossing device, allowed to set and then rolled up or otherwise put in a form for handling.

The prior art procedures are satisfactory for many purposes such as for example the application of a decorative design, since any defects, assuming that reasonably good embossing rolls have been used, usually would not be of such a magnitude as to be physically noticeable. However, in the instance of very accurate embossing such as the embossing of film for certain technical purposes, proceeding in accordance with the prior art, while producing an embossed product, produces a product which may contain certain defects referred to as stripping defects. That is, after the embossing device has been impressed against the sheet there is some tendency for the sheet to hang on past the natural stripping point. That is, the sheet does not flow smoothly from the embossing cylinder but may come off with somewhat of a snapping action which in some instances is perhaps not too readily discernible, but in many instances is visible. That is, on close inspection an irregular movement of the film path on leaving the embossing cylinder may be noted. Also, the snapping is usually audible. Nevertheless, uneven stripping action may result in very tiny ragged tears on the surface of the embossed product.

The exact cause of this is unknown and the severity of this defect may vary from one batch of sheeting to another, and with differences in embossing devices. The snapping action may in some instances diminish at low speeds and in other instances diminish at higher speeds.

In making embossed film for kinescope recording purposes and the like, where the embossing is applied to the film for certain technical reasons as contrasted to mere decorative purposes, it is apparent that providing for relatively accurate embossing, free from defects of the above type, represents a highly desirable result. That is, in the industry today there is produced embossed film wherein the embossed configurations on the film are placed thereon for certain optical purposes with respect to which accuracy and uniformity are important features. After extended investigation I have found a method which in certain respects are similar to prior art methods and apparatus but which obviates to a substantial extent the difficulties of stripping problems referred to above.

This invention has for one object to provide an improved method for embossing film. Another object is to provide a method whereby the embossed film obtained therefrom is relatively free of stripping defects. Still another object is to provide a method which may be operated at reasonably high speed of production yet produce a relatively accurate, uniform, embossed product. Still another object is to provide a method which in many respects may follow prior art procedure, thereby not necessitating the aquisition of special or new embossing equipment. Another object is to provide a method of the class described which is relatively simple and economical. Other objects will appear hereinafter.

I have found that by applying certain preliminary treatment steps to the film to be embossed as it is fed to the embossing equipment, and utilizing certain liquids containing controlled amount of release agent as will be described in detail, that the embossing process not only is facilitated, but the resultant embossed product is reasonably free of stripping defects. That is, as will be described in more detail hereinafter, a controlled amount of chemical, between 1.5 and 2.5%, is incorporated in the softening solvent or otherwise brought in contact with the embossing device, which procedure permits better stripping of the embossed product from the embossing roll. The amount of chemical agent used is of importance, as below 1.5% the stripping pattern is not particularly satisfactory. On the other hand, utilizing above 2.5% may cause noticeable streakiness on the embossed surface.

For a more complete understanding of my invention reference will be made to the attached drawing forming a part of the present application.

Figure 2:
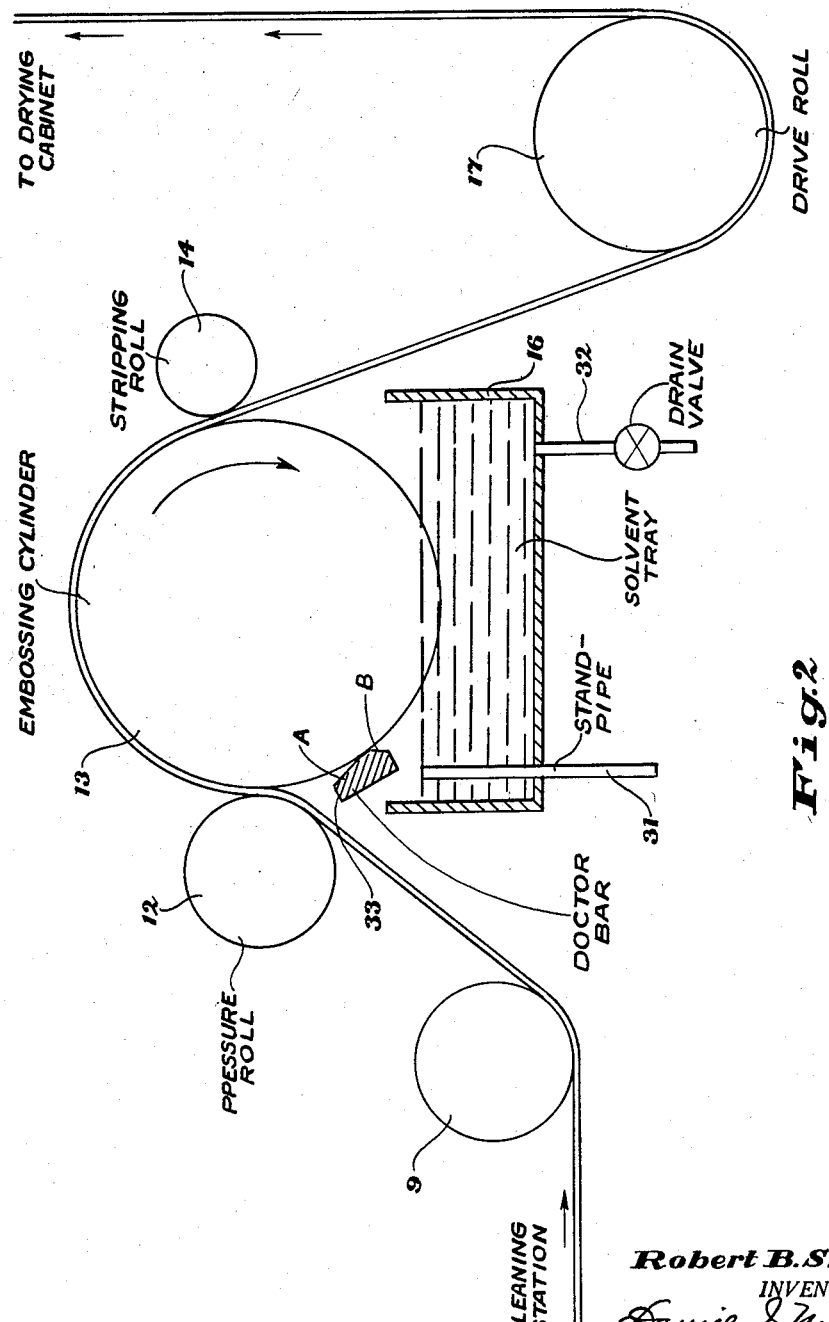

In the attached drawing Fig. 1 is a diagrammatic, side elevation view of an over-all apparatus assembly such as may be used in carrying out my method. Fig. 2 is likewise a diagrammatic side elevation view of a portion of Fig. 1, but on an enlarged scale, showing the embossing cylinder and related parts.

Referring to Fig. 1, 2 is a roll of the raw stock to be embossed. That is, 2 represents a roll of thin film with respect to which it is desired to emboss on one surface a certain accurate configuration. For example, it might be desired to treat the film to form lenticules thereon. This roll of stock 2 feeds to a plurality of rolls 3 and 4 of conventional construction. Rolls 3 and 4 provide a convenient position whereby when one supply of film is exhausted, a new supply may be spliced onto the end of the film going through the process. This permits of continuous, relatively high speed operation. The film 5 to be embossed is looped over a plurality of other conventional rolls 6. At the bottom of the film loops there is provided a plurality of floating rolls 7, such combination serving to condition the film before it is fed to further steps of the process. That is, considering that the film has been tightly rolled on 2, the construction just mentioned serves to help eliminate any kinks or other temporary physical deformations which have gotten into the film during storage.

After leaving the conditioning device 6—7 just mentioned, the film passes in contact with idler-guide rolls 8 and 9, between which is positioned means 11. This means 11 which is for cleaning the film before it goes to the embossing, may be constituted of several parts depending upon the particular film being processed and its condition. It is important that the film be freed of any dirt or other foreign matter inasmuch as foreign matter carried on the film can be discharged on the embossing device, thereby impairing such device in a manner that the impairment is reproduced upon each revolution thereof. In general the cleaning device 11 may comprise a plurality of cleaning pads (under slight pressure) through which the film 5 passes, and is thereby mechanically cleaned in a conventional manner. In addition, air nozzles may be directed against the surface of the film either before or after the pads, or both, by means of which air cleaning may be accomplished. Or, in place of air blasts in certain instances vacuum type cleaning may be employed. In other words, this particular invention is not restricted by the exact mode of cleaning.

The cleaned film then passes between pressure roll 12 and the embossing cylinder 13, leaving the cylinder at stripping roll 14.

The bottom of the embossing roll 13 bathes in pan 16 which contains the special solvent composition used in the present process. However, since certain of these aspects will be described in greater detail in connection with Fig. 2, further reference at this point appears unnecessary.

The embossed film leaving the embossing device at 14 then passes around drive roll 17. This drive roll may be of any good conventional construction. That is, a drive roll would be used which will move the film through the process in a reasonably steady, uniform manner and at the desired speed of operation.

The film pulled off the embossing roll by drive roll 17 just mentioned, is then fed over a plurality of idler rolls making up the part indicated over-all at 18. This group of idler rolls and the number thereof may be similar to conventional arrangements for drying film; hence extended description appears unnecessary.

It is sufficient to point out that after the film is embossed it is contained in a drying chamber having sufficient rolls and the like to permit the evaporation of a substantial part of residual solvent and the hardening of the embossed design. It will be noted that in withdrawing the embossed film it passes around the drive roll as well as the succeeding idler rolls in a manner so that the embossed surface is outermost.

After leaving the drying arrangement 18, the film passes into another combination of rolls and floating rolls 19 and 21, which is substantially comparable to the combination of rolls 6 and 7 already described. By this arrangement the film is more readily fed around the two rolls 22 and 23 which immediately precede the take-up roll 24. Here again the take-up roll may be of conventional construction and functions to wind up the finished embossed film. This take-up roll would be driven at suitable speed not to impart undue tension on the processed film. The combination of parts 19 and 21 just described, permits considerable compensation in the operation of the process. That is, if embossed film is being taken off by drive roll 17 at a higher rate than the film is being taken off on take-up roll 24, rolls 21, because they are free to float, function to take up slack.

Reference is now made to Fig. 2 which shows the embossing cylinder and certain associated parts on an enlarged scale. It will be noted that rolls 9, 12, and 14 comprise the roll at the cleaning station, the pressure roll and the stripping roll, already referred to above. The part 13 comprises the embossing cylinder which carries on the surface the configuration which it is desired to transfer to the film being embossed. For example, in imparting optical features to the film by embossing, the embossing cylinder in the present invention would carry a plurality of grooves cut into a bronze cylinder. Preferably these grooves are chromium plated for providing an improved surface.

The bottom of the embossing cylinder is bathed in pan 16 which contains liquid composition which will be described in detail hereinafter. This liquid may be circulated and the level thereof in the pan controlled by means of inlet pipe 31 and valve drain pipe 32.

Positioned in very close proximity to the embossing cylinder as it emerges from the pan is a doctor blade 33. This doctor bar should be of accurate construction so that it may be set very close to the embossing cylinder, yet spaced therefrom a minute distance. By employing an accurate, carefully positioned doctor bar it is possible to assist in controlling the uniformity of the application of the solvent being picked up from pan 16.

As already mentioned above, 17 is suitable drive roll which motivates the film being embossed over the embossing cylinder to the drying cabinet. The various legends appearing on Fig. 2 it is believed aid in a full understanding of the several parts shown in this figure.

Attention will now be directed to the solvent liquid contained in pan 16. The function of this liquid is to slightly soften the film so that the embossing may readily take place. I have found that liquid comprised of halogenated hydrocarbon having a certain controlled content of the additive dioctyl sodium sulfosuccinate is a particularly useful and effective solvent. In more detail, the solvent might be beneficially comprised of a mixture of six volumes of methylene chloride containing about one volume of ethylene chloride. In some instances trichloro-trifluoroethane may also be incorporated in the solvent. The additive should be reasonably exactly controlled to about 1.5–2.5% of the solution as has been pointed out.

This solvent which is contained in pan 16 is picked up on embossing cylinder 13 as it rotates. As already mentioned above, by having a properly positioned doctor bar 33, the amount contained on the cylinder is rendered uniform. By this control the surface of the film being embossed is substantially uniformly treated with the solvent and accordingly softened to the same extent.

The additive which I have described, when employed in the portions indicated, permits the stripping of the embossed film at roll 14 without snapping or other such difficulties which may occur if the procedure just referred to is not followed. That is, if less than about 1.5% of the additive is included, then the embossed film at about roll 14 may tend to hang onto the embossing cylinder beyond the desired release point. Of course, the drive roll 17 will ultimately pull the embossed film off the embossing roll, but such irregular release may adversely affect the embossed configurations. The use of 1.5–2.5% of this additive in accordance with the present invention makes it posisble to operate the embossing machines at speeds from 15–25′/min. with freedom from stripping defects. Without this addition, it would be necessary to operate the machines at impractically low speeds to avoid the stripping defect.

On the other hand, if for example more than 2.5% of additive is incorporated, the results are not as satisfactory as desired because streakiness and the like defects may appear on the embossed film. Further details concerning the foregoing will be apparent as the description proceeds.

The functioning of the apparatus is believed apparent to a substantial extent from the description already set forth and the legends appearing on Fig. 2. However, some further brief description relative to procedure for starting up the apparatus may be of value. In starting up the apparatus it would be desirable to first examine the embossing cylinder for freedom from any scum and dirt. Also, the pressure roll, stripping roll, and drive roll would be checked for dirt and proper positioning. The pan 16 would be filled with the suitable solvent mixture. If the system is provided with a circulating pump whereby the solvent may be constantly withdrawn from the pan and filtered, replenished or otherwise treated and then recycled to the pan, the pump would be started so that the solvent system is put in operation.

The film to be embossed would be fed through the apparatus such as by attaching a leader strip if desired. The air circulation in drying chamber 18 and in the cleaning station 11 would be started, then the clutch on drive roll 17 and on take-up roll 24 would be engaged so that the film to be embossed moves through the equipment. The apparatus may be run continuously and when the roll of stock 2 becomes exhausted, a further roll may be spliced at, for example, between rolls 3 and 4. Samples may be taken from time to time from the film being wound up on take-up roll 24, for inspection to determine the quality and accuracy of the embossing.

A still further understanding of our invention may be had from consideration of the following example:

In accordance with this example the film to be embossed, namely the film stock on roll 2, was comprised of acetate propionate. The particular composition was an acetate propionate having about 13–15% propionyl, 9–31% acetyl and about 2% hydroxyl. The film stock also contained about 8 parts of triphenyl phosphate per 100 parts of cellulose ester as plasticizer. This film stock had been made by solvent casting from a halogenated hydrocarbon-alcohol solvent, and as placed on roll 2 was in a substantially fully cured condition. This particular type of sheeting is being described in this example since it is a type of sheeting which has presented some problems of embossing by prior art procedures.

This acetate propionate film just described was fed between rollers 3 and 4 and around rolls 6 and 7 which loosened up the film thereby rendering it in a good position to pass into cleaning station 11. In cleaning station 11 the film surface was contacted not only with an air blast, but with fabric pads, which treatment removed any dirt particles, dust or the like therefrom. The clean film, by passing over roll 12, was held in contact with the rotating embossing cylinder 13. The cylinder was bathed in a liquid comprising about 84% methylene chloride, 9% ethylene chloride, 5% trichloro-trifluoroethane, and slightly under 2% of dioctyl sodium sulfosuccinate. The doctor bar 33 is set to a clearance at (a) of about .003" and at (b) of about .014". This setting controls the amount of solvent on the embossing roll to the desired extent, at the particular speed of operation, in this example say at around 17 feet per minute. The film in contact with the embossing cylinder from pressure roll 12 to stripping roll 14 becomes embossed to the correct depth and readily leaves the embossing cylinder uniformly just beyond roll 14. The embossed acetate propionate film then passes around drive roll 17 with its embossed surface outward to the drying chamber 18. In the drying chamber 18 any slight amount of residual solvent which was picked up from the embossing roll is volatilized. The substantially dried film then passes around the rolls at 19 and 21 to the guide rolls 22 and 23, whereby it may be readily taken up on take-up roll 24. Samples of this embossed acetate propionate film were cut out from time to time just before take-up roll 24. These samples were subjected to comparison one with another as well as microscopic and optical tests. The embossed configurations were found to be entirely uniform and to meet the optical tolerances required.

In a similar manner sheeting comprised of cellulose acetate having an acetyl content between about 38 to 44% was subjected to embossing as in the foregoing example. Such type of sheeting embosses more readily than the mixed ester sheeting described in the previous example. Tests on samples of the embossed cellulose acetate sheeting likewise showed that the embossings were uniform and possessed the desired degree of optical accuracy. When embossing cellulose acetate sheeting having an acetyl below 40% the solvent used in pan 16 might be comprised of acetone. When the sheeting has an acetyl content, for example, of 42–44%, the solvent might be comprised of methylene chloride and methyl alcohol containing suitable additive. As discussed above, I prefer to employ as the additive dioctyl sodium sulfosuccinate having the formula:

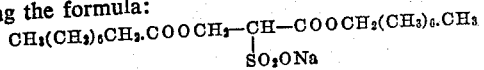

As also explained above, it is important to control the amount of this additive to 1.5–2.5% for obtaining the desired results.

In carrying out my process, however, there are certain departures which may be made from the exact values set forth above. For example, the solvent composition used in pan 16 might be varied as illustrated by the following three formulas:

Percent

A.

Methylene chloride _____ 85
Ethylene chloride _____ 15

B.

Methylene chloride _____ 85
Ethylene chloride _____ 10
Freon 113 (trichlorotrifluoroethane) _____ 5

C.

Methylene chloride _____ 85
Methanol _____ 15

Therefore, it is believed apparent from the foregoing that an improved method for embossing film has been provided.

I claim:

1. The process for accurately and uniformly producing embossed cellulose acetate propionate film wherein the finished embossed film is relatively free from stripping marks, which comprises feeding the film to be embossed over a plurality of rolls, certain of which rolls are floating rolls, for opening up the film, subjecting the opened up film to cleaning operation comprising both an air blast and physical contact of the film with cleaning pads, passing the cleaned film in contact with an embossing cylinder, said embossing cylinder carrying a thin film of solvent containing 1.5–2.5% of a dioctyl sodium sulfosuccinate additive, said additive serving to permit the release of the embossed film from the embossing cylinder without stripping marks, passing the embossed film with any slight amount of residual solvent thereon through a drying chamber for reducing residual solvent, then passing the dried film over rolls, certain of which rolls are floating rolls, to take-up means.

2. The process for accurately and uniformly producing embossed cellulose ester film wherein the finished embossed film is relatively free from stripping marks, which comprises feeding the film to be embossed over a plurality of rolls for opening up the film, subjecting the opened up film to cleaning operation comprising both an air blast and physical contact with cleaning pads, passing the cleaned film in contact with an embossing cylinder, said embossing cylinder carrying a thin film of solvent containing 1.5–2.5% of a dioctyl sodium sulfosuccinate additive, said additive serving to permit the release of the embossed film from the embossing cylinder without stripping marks, passing the embossed film with any slight amount of residual solvent thereon through a drying chamber for reducing residual solvent, then passing the dried film over rolls to take-up means.

3. The process for producing embossed cellulose ester film wherein the embossing on the finished film exhibits improved uniformity and accuracy, freedom from stripping defects and reasonably meets optical tolerances, which comprises feeding the cellulose ester film to be embossed over a plurality of rolls whereby the film is opened up, subjecting the opened-up film to cleaning, passing the cleaned film into contact with an embossing cylinder, said embossing cylinder carrying a thin film of a halogenated hydrocarbon solvent which contains 1.5–2.5% of a dioctyl sodium sulfosuccinate additive, said additive serving to permit the lease of the embossed film from the embossing cylinder without stripping marks, passing the embossed film with any slight amount of residual solvent thereon through a drying chamber for reducing residual solvent, then passing the dried film over rolls, certain of which rolls are floating rolls, to take-up means.

4. The process for producing embossed cellulose acetate propionate film, which comprises feeding the film to be embossed over a plurality of rolls for opening up the film, subjecting the opened up film to cleaning operation, passing the cleaned film in contact with an embossing cylinder, said embossing cylinder carrying a thin film of solvent containing 1.5–2.5% of a dioctyl sodium sulfosuccinate additive, said additive serving to permit the relatively uniform release of the embossed film from the embossing cylinder, passing the embossed film with any slight amount of residual solvent thereon through a drying chamber for reducing residual solvent, then passing the dried film over rolls to take-up means.

References Cited in the file of this patent

UNITED STATES PATENTS

| | | |
|---|---|---|
| 988,981 | Danzer | Apr. 11, 1911 |
| 1,744,829 | Dreyfus | Jan. 28, 1930 |
| 1,964,724 | Dreyfus | July 3, 1934 |
| 2,002,711 | Parkhurst et al. | May 28, 1935 |
| 2,176,423 | Jaeger | Oct. 17, 1939 |
| 2,403,461 | Samson | July 9, 1946 |
| 2,609,568 | Getchell | Sept. 9, 1952 |
| 2,681,612 | Reimann | June 22, 1954 |
| 2,753,592 | Cockran | July 10, 1956 |